United States Patent [19]

Dominguez-Burguette

[11] 3,871,944
[45] Mar. 18, 1975

[54] INTEGRAL COMPOSITE ELEMENT USEFUL IN ELECTROSTATIC CLUTCH OR BRAKE DEVICES

[75] Inventor: Mario Dominguez-Burguette, North Saint Paul, Minn.

[73] Assignee: Minnesota Mining and Manufacturing Company, Saint Paul, Minn.

[22] Filed: June 11, 1973

[21] Appl. No.: 368,718

[52] U.S. Cl.................. 161/42, 161/162, 161/215, 188/159, 188/251, 192/84, 192/107, 264/331
[51] Int. Cl....... B32b 1/04, F16d 37/02, B32b 5/16, F16d 69/00, B32b 19/02, B60l 7/10
[58] Field of Search............ 161/42, 168, 215, 162; 192/107 M, 84 E; 188/25 M, 159; 264/248, 331

[56] References Cited
UNITED STATES PATENTS

| | | | |
|---|---|---|---|
| 2,273,770 | 2/1942 | Nanfeldt | 264/331 |
| 2,923,390 | 2/1960 | Fitch | 192/84 E |
| 3,002,596 | 10/1961 | Fitch | 192/84 E |
| 3,240,306 | 3/1966 | Armstrong | 192/84 E |
| 3,343,636 | 9/1967 | Donelan et al. | 192/84 E |
| 3,655,609 | 4/1972 | Evans et al. | 192/107 M |

Primary Examiner—Philip Dier
Attorney, Agent, or Firm—Alexander, Sell, Steldt and DeLaHunt

[57] ABSTRACT

An integral laminar composite semiconductive element having a highly conductive surface is provided by a layer of semiconductive particles and a layer of metal particles. The layers are integrated with and bonded together by a hard nonconductive thermoset bonding resin. The semiconductive element is especially useful in electrostatic clutch or brake devices such as those utilizing the Johnsen-Rahbek effect.

8 Claims, 5 Drawing Figures

PATENTED MAR 18 1975 3,871,944

INTEGRAL COMPOSITE ELEMENT USEFUL IN ELECTROSTATIC CLUTCH OR BRAKE DEVICES

This invention relates to electronic semiconductors, and more particularly to a composite structure comprised of particulate semiconductive material and metal powder integrated with a bonding resin. The composite structure finds use in electrostatic devices such as those utilizing the Johnsen-Rahbek effect.

The Johnsen-Rahbek effect involves the production of an electrostatic attraction between a surface of an electrically conducting element and a closely adjacent surface of a semiconductive element. This attraction is produced when sufficient voltage is applied between the elements. The surfaces of the elements are positioned in close slipping contact so that the force produced between them when the proper voltage is applied, is capable of increasing the frictional force therebetween.

The semiconductive element for such devices is customarily fabricated from any of a variety of materials having a volume resistivity within the range of $2^2$ to $10^{10}$ ohm cm. Such materials include limestone, slate, jasper, agate, and semiconductive carbon commposed of partially carbonized cellulose or hemicellulose. Additional semiconductive materials include normally conductive substances which have been degraded (e.g., by heat) to endow them with limited electronic resistivity and normally insulating substances which have been degraded to endow them with limited electronic conductance.

Regardless of the composition, a semiconductive element must be first formed from the material into a suitable shape such as a disc which can then be mounted in an appropriate retainer in the device. Typically, such forming is accomplished by machining a block of the material or by molding powdered material with a suitable binder to produce a homogeneous semiconductive element. Both of these methods have failings. Semiconductive materials are characterized by being extremely brittle; therefore, they are difficult to machine and easily broken. Both the machined and the molded elements are difficult to attach to the electrostatic device since they are required to be relatively thin for the aforementioned use. Great care must therefore be taken to avoid breaking the elements during handling and in use. Additionally, the prior art elements are generally adherently fastened to a retainer within the device by electrically conductive cement, creating additional problems which may be caused by bridging of the conductive adhesive which can produce an electrical short and/or by failure of the adhesive bond between the retainer and the element which can produce an open circuit.

BRIEF SUMMARY OF THE INVENTION

In accordance with the invention, an integral composite semiconductive element is provided by a layer of particulate semiconductive material and a layer of highly conductive powdered metal. The entire element is integrated with a hard thermoset bonding resin. The particulate material of each layer is bonded together with resin only in an amount sufficient to provide an integral self-supporting handleable rigid structure, but not sufficient to electrically isolate the metal or the semiconductive particles in their respective layers or at the interface between the layers. The entire element is extremely rigid, not subject to breaking, easily handleable, and self-supporting, and has the added feature of being easily capable of electrical attachment merely by contact with the highly conductive surface thereof. The element may be inserted into the retainer and easily electrically attached therein without the use of electrically conductive adhesives.

BRIEF DESCRIPTION OF DRAWINGS

The invention is illustrated by reference to the accompanying drawings wherein.

DETAILED DESCRIPTION OF THE INVENTION

Figure 2:
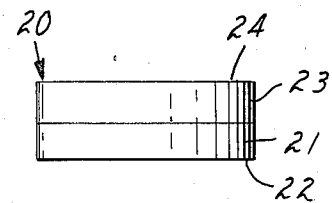
FIG. 2 is a side elevational view of an element made utilizing the apparatus and method shown in FIG. 1.

Referring to FIG. 2, the invention provides a composite element 20 comprised of a semiconductive layer 21 which provides a semiconductive surface 22 and a conductive layer 23 which provides a conductive surface 24. Semiconductive layer 21 is comprised of particulate semiconductive material which is bonded together by a suitable non-conductive thermoset bonding resin. Conductive layer 23 is formed of powdered conductive metal similarly bonded together by a compatible thermoset bonding resin which may be either conductive or non-conductive. The powdered materials comprising layers 21 and 23 are bonded by sufficient resin to provide a rigid, handleable, self-supporting, relatively strong structure; yet the amount of resin is not so great as to electrically isolate either the particles of each layer from each other or the adjoining surfaces of the two layers. In other words, the particles in each layer are in electronic communication with one another, as are the layers of the element.

Figure 1:
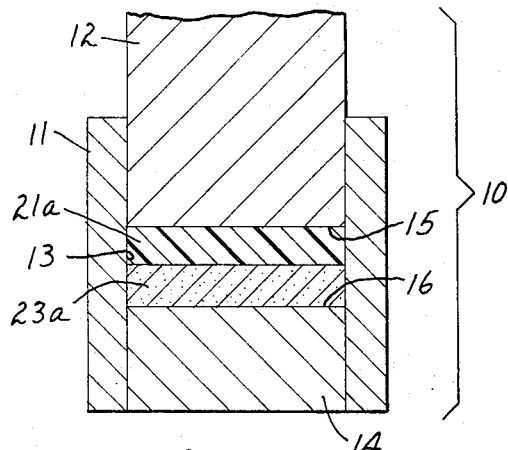
FIG. 1 is a side cross sectional view showing the preparation of the composite element of the invention and apparatus useful therefor.

As shown in FIG. 1, the composite element of the invention may be prepared by utilizing a suitable compacting die 10 comprised of a mold 11, a ram 12 which is slidably movable within the mold cavity 13, and a removable bottom 14 which may have surface undulations to form projections on or indentations in the conductive surface of the element to facilitate electrical contact. Mold cavity 13 of mold 11 will define the circumference of an element made therewith, and the working face 15 of ram 12 and the working face 16 of removable bottom 14 define the top and bottom, respectively, of the composite element.

A composite element may be prepared by depositing a conformable (e.g., putty-like or free-flowing) uniform mixture of metal particles and binder to form a uniform layer 23a thereof at the bottom of the mold and placing a mixture of particulate semiconductive material and binder thereon as a uniform layer 21a, applying pressure with the contacting die ram and solidifying the binding material. Once solidified, the resultant composite 20 structure, having conductive layer 23 and semiconductive layer 21, is ejected from the die. It is generally desired to thereafter grind surface 22 of the semiconductive layer substantially flat, if it was not initially so formed by the compacting die.

Figure 5:
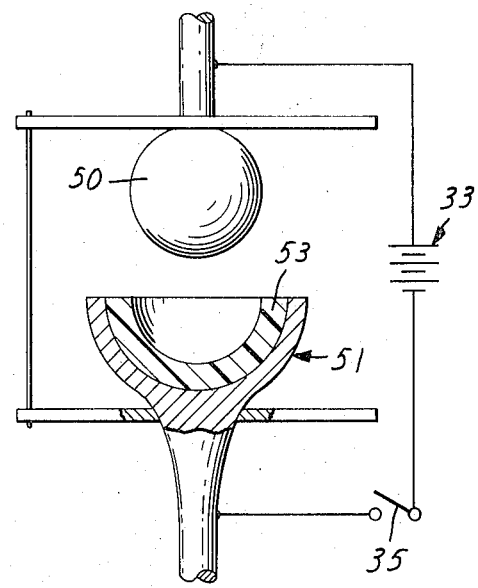
FIG. 5 is a side elevation view (with some parts in section) of an electrostatic device utilizing another embodiment of the invention.

As an alternative to the method described above, the mixture forming the semiconductive layer may be first placed in the mold and the mixture forming the conductive layer thereafter. Where other shapes for the element are desired, molds having the counterparts of such shapes will be used, such modifications being within the knowledge of those skilled in the powder compacting art. For an example, see FIG. 5 wherein the conductive element, rather than being a flat plate, is in the shape of a sphere 50 and the composite element 51 bearing the semiconductive layer is the counterpart of the spherical shape, i.e., a socket having the semiconductive layer 53 as an inner surface.

When the composite element of the invention is formed, the semiconductive/binder mixture is generally tamped into the mold in a relatively evenly spread layer using a slight pressure, for example, no more than about 1.5 kg/cm$^2$ (preferably no greater than about 0.5 kg/cm$^2$) before applying molding temperature and pressure. If pressures greater than about 1.5 kg/cm$^2$ are applied before the material is evenly spread, uneven moldings may result. Then a predetermined amount of a homogeneous mixture of the conductive material and binder is spread evenly over the first layer. The latter mixture is also lightly tamped to assure complete filling of the die without voids. After filling, the die is heated in a press to the flowing temperature of the binder, and a pressure between 200 and 3000 kg/cm$^2$ (preferably between 1000 and 1200 kg/cm$^2$) is applied. The pressure may be cycled 3 or 4 times from zero to about 1500 kg/cm$^2$ to insure complete filling of the mold cavity. Thereafter, while maintaining a pressure between about 200 and 800 kg/cm$^2$, the die is heated to the hardening temperature of the binder. The pressure is thereafter released and the molded element removed from the die. The molded part may then be polished and the conductive support of the element drilled or otherwise prepared for mounting as desired.

Figure 3:
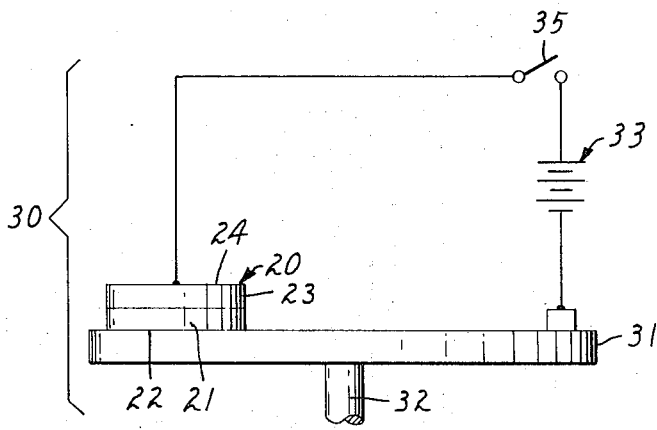
FIG. 3 is a side elevational view of an electrostatic device utilizing a composite element according to the invention.
Figure 4:
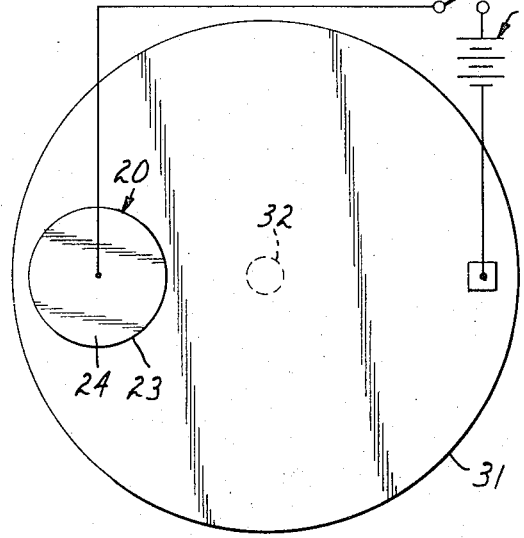
FIG. 4 is a top plan view of the device shown in FIG. 3.

FIG. 3 depicts a simplified example of an electrostatic device 30 which may use a composite semiconductive element 20 such as that described above. Device 30 is comprised of a rotatable conductive element such as metal plate 31 which rotates on an axis 32 and is in electrical contact with a direct current electrical source 33 and which source in turn is in controlled intermittent electrical contact with the conductive surface 24 of the composite element 20, the latter electrical contact being controlled by a switch 35. Composite element 20, held in fixed position by a suitable retainer 9not shown), has its semiconductive face 22 in slidable electrical contact with the surface of conductive element 31. Rotatable conductive element 31 is adhesively engaged with composite element 20 by closing switch 35 to cause a completed circuit which applies a voltage across the semiconductive portion of the element and produces the desired Johnsen-Rahbek force.

Any semiconductive material which can be pulverized or ground into a powder may be used to prepare the composite semiconductive element of the invention, provided that it has, as previously stated, a volume resistivity within the range of 10$^2$ to 10$^{10}$ ohm cm (most preferably between 10$^7$ and 10$^8$ ohm cm). The semiconductive material should also resist decomposition when heated at a temperature of at least 100°C (preferably 200°C). Examples of semiconductive materials that may be used to prepare the composite semiconductive element include both ionic semiconductive materials and electronic semiconductive materials. Ionic semiconductive materials will usually require a humectant or some other means of maintaining moisture therein. Examples of semiconductive materials useful in the present invention include limestone, slate, agate, semiconductive carbon, silicon carbide, ceramic materials such as barium titanate, strontium titanate, lead titanate, tin titanate, magnesium or calcium zirconate and the like containing certain additives which make them semiconductive, and certain oxide such as titanium dioxide mixtures of magnesium and titanium dioxides.

The preferred semiconductive materials are electronic in character. The most preferred electronic semiconductive material is the phthalein-fluoran polymer described in applicant's U.S. Pat. N. 3,721,649, the disclosure of which is incorporated herein by reference. As described in the patent, phthaleinfluoran semiconductive polymers are produced by the condensation reaction of alpha-hydroxyanthraquinone or alpha-hydroxynaphthalene with phthalic anhydride, 1,8-naphthalic anhydride or 3,4,5,6-tetrahydrophthalic anhydride.

The particle size of the semiconductive material should preferably be less than about 150 microns in maximum extent, most preferably less than 100 microns. The shape of the semiconductive particle is not critical, and it may be a spheroid, ovoid, or irregular shape such as may be produced by crushing or grinding utilizing conventional equipment or techniques.

The powered metal contained in the conductive layer should be solid at 100°C (preferably solid at 200°C), and be non-reactive when used under ambient conditions including atmospheric oxygen and moisture. When exposed to the atmosphere the surface of the metal should not form reaction products which would diminish appreciably or destroy its electronic conductance. The metals which are preferred for the conductive layer include iron, cobalt, nickel, copper, gold, silver, platinum, aluminum, and tin, reduced iron being the most preferred.

The particle size of the metal powder is not critical, although it is preferred that the metal particle be no greater than 500 microns in maximum extent. The most preferred metals have an average particle size of less than about 100 microns since such particles provide better resistance against abrasion and breakage in the final product.

The preferred binder for binding the semiconductive particulate material and the powdered metal together in their respective layers and layers together is a synthetic organic nonconductive thermoset resin. (By "thermoset" is meant the resin has an initial fusible or liquid state and, on heating to a suitable temperature, it will harden to form a rigid infusible product which will not soften or melt with subsequent heating below its decomposition temperature.) The thermoset resin should be substantially nonconductive (i.e., have a volume resistivity of at least 10$^{10}$ ohm cm), have a compression molding temperature between about 100° and 250°C (preferably between 140° and 200°C) to provide ease of molding, and a compression strength of at least 10,000 psi (preferably 30,000 psi) to impart adequate strength to the element. Examples of such thermoset resins include those of phenol-aldehyde type (e.g., phenol-formaldehyde and phenol-furfural). The particulate material in the semiconductive layer and the powdered metal in the conductive layer may each be bonded together with different thermoset resins; however, in most cases it is more convenient to use the same resin for each layer.

The semiconductive layer will be comprised of between 70 and 98 percent by weight semiconductive material (preferably between 80 and 97 percent) to maintain the desired electrical communication between particles yet provide a sufficiently strong element. The semiconductive layer should be between 0.3 to 1.2 mm thick (preferably between 0.7 and 0.8 mm) to provide the appropriate Johnsen-Rahbek effect.

Powdered metal will comprise about 70 to 98 percent by weight (preferably 90 to 95) of the conductive layer, this being sufficient to provide the required particle-to-particle contact which permits electrical conductance, yet still providing a sufficiently strong element.

The invention is illustrated by the following example.

EXAMPLE

An integral composite semiconductive element suitable for use in an electrostatic clutch or brake was prepared by first placing in the 2.5 cm diameter cavity of a compacting die, 5.0 g of a homogeneous mixture of 18.0 g of pulverized reduced iron (average particle size 100 microns) and 2.0 g of powdered phenolic resin precursor (sold under the trade designation "BRP-4404"). (The resin sold under the trade designation "BRP-4404" is a phenol formaldehyde novolac resin containing 8.8 percnet hexamethylene tetramine.) The mixture was tamped using a small flat-ended dowel to provide a uniform thickness. A second mixture consisting of 0.7 g of a uniform blend of 9.5 g of powdered phthalein-fluoran polymer (Example 6 of U.S. Pat. No. 3,721,649, having an average particle size of 125 microns) and 0.5 of the powdered phenolic resin precursor was placed on top on the first layer and tamped to uniform thickness with the dowel. The compacting die ram was then inserted into the die cavity, the die placed into a hydraulic press and pressed at 1500 kg/cm² while heating the die so that its temperature rose at a rate of about 5.0°C per minute, during which time the pressure was cycled 3 or 4 times from zero to 1500 kg/cm. Heating was continued until the temperature was 160°C, the thermosetting temperature of the resin. Thereafter, the die was opened and the resultant integral composite element ejected therefrom. The composite element had a 2.8 cm diameter, a semiconductive layer thickness of 0.825 mm and a conductive layer thickness of 1.9 mm and resembling the structure shown in FIG. 2. Mounting screw holes were readily drilled into the conductive portion of the disc without fracturing it. After polishing the semiconductive surface of the disc to a flat surface and a semiconductive layer thickness of 0.73 mm specific resistivity was measured and found to be about $3 \times 10^8$ ohm-cm, indicating the element to be suitable for use in an electrostatic device similar to that shown in FIG. 3. After many hours of successful operation in such a device repeatedly using a braking voltage of 400 volts, the device was voluntarily shut off and the disc examined for defects. None was found.

An added advantage obtainable with the composite elements of the invention is that the conductive portion thereof can be shaped during molding with surface undulations or indentations such as bosses, ears, holes, etc, to facilitate mechanical, as well as electrical, attachment of the element in the device wherein it is used.

What is claimed is:

1. An integral composite element having a highly electrically conductive surface and a semiconductive surface, said element being especially suited for use in electrostatic brake or clutch devices, comprising a first layer of bonded particulate semiconductive material and a second layer of bonded particulate highly conductive metal, said metal being solid at room temperature and capable of prolonged exposure to an ambient atmosphere without appreciable reduction in electrical conductance, said particulate semiconductive material and said particulate metal being bonded together with a quantity of thermoset resin sufficient to provide an integral, self-supporting, handleable, rigid article but not sufficient to electrically isolate either the metal particles or the semiconductive particles in their respective layers and at the interface between the layers.

2. The composite element of claim 1 wherein said metal is selected from the group consisting of gold, silver, platinum, iron, aluminum, copper, and tin.

3. The composite element of claim 1 where the semiconductive material is a phthalein-fluoran polymer.

4. The composite element of claim 1 wherein the semiconductive layer is from 0.3 to 1.2 mm thick.

5. The composite element of claim 1 wherein the semiconductor material comprises from about 70–97 percent by weight of the semiconductive layer.

6. The composite element of claim 1 wherein the thermoset resin is a phenol-aldehyde resin.

7. The composite element of claim 1 wherein said metal is pulverized reduced iron.

8. The composite element of claim 1 in the shape of a flat disc.

* * * * *